United States Patent [19]
Coulthard

[11] 3,811,750
[45] May 21, 1974

[54] PROJECTION SCREENS

[75] Inventor: James Albert Coulthard, Sheffield 10, England

[73] Assignees: Marie Luise Batzner Coulthard; David Malcolm Pearson, both of Sheffield, England

[22] Filed: July 18, 1972

[21] Appl. No.: 272,868

[52] U.S. Cl. ............................... 350/117, 350/129
[51] Int. Cl. .......................................... G03b 21/60
[58] Field of Search ............ 350/128, 129, 117, 126

[56] References Cited
UNITED STATES PATENTS

| | | | |
|---|---|---|---|
| 2,934,997 | 5/1960 | Harkness | 350/126 |
| 3,679,451 | 7/1972 | Marks et al. | 350/126 X |
| 3,507,548 | 4/1970 | Hoffman et al. | 350/117 |
| 1,854,864 | 4/1932 | Semenity | 350/117 |
| 3,653,740 | 4/1972 | Ogura et al. | 350/117 |
| 2,177,572 | 10/1939 | Hugel | 350/117 |
| 2,529,701 | 11/1950 | Maloff | 350/128 |
| 2,875,087 | 2/1959 | Crandon | 350/129 X |
| 2,928,131 | 3/1960 | Mahler | 350/117 |

Primary Examiner—Monroe H. Hayes
Assistant Examiner—E. M. Bero
Attorney, Agent, or Firm—Lowe, King & Price

[57] ABSTRACT

A projection screen affording wide angle viewing comprises a backing with a relfective hairline surface, with a matt overlay of transparent material consisting of a coating of a pigmented solution of a modified vinyl acetate/vinyl alcohol copolymer in a mixture of ketones and hydrocarbons to afford a sharp and brilliant picture in daylight, or with an overlay consisting of a transparent plastics film having a brushed finish on the surface remote from the backing, with the lines of both materials extending in the same direction to afford even wider angle viewing in subdued lighting or total darkness.

16 Claims, 6 Drawing Figures

PATENTED MAY 21 1974 3,811,750
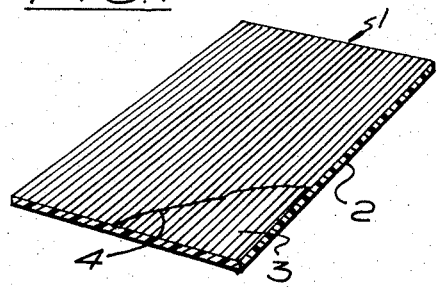
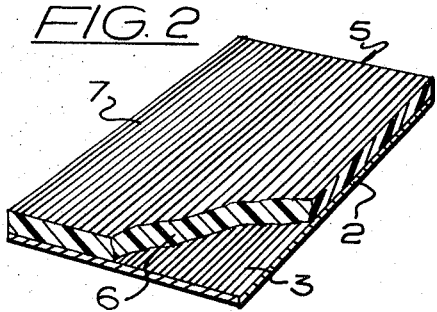
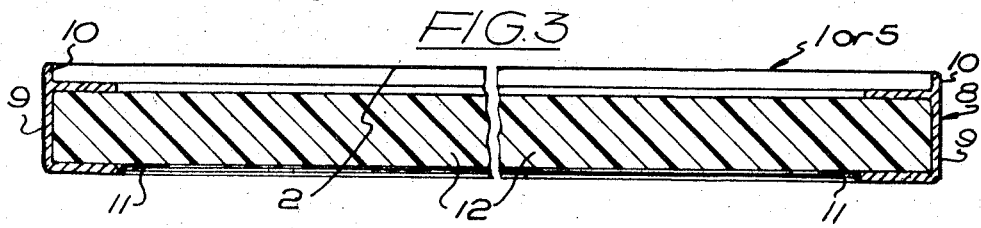
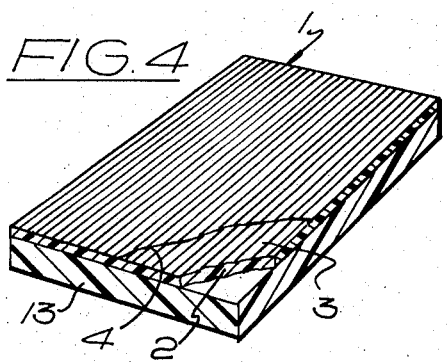
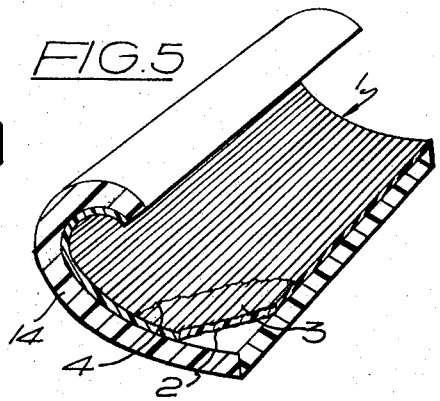
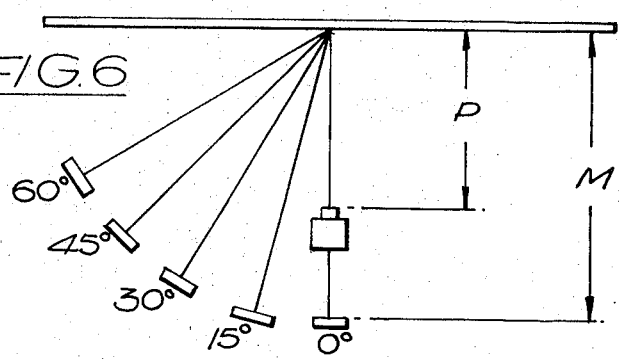

PROJECTION SCREENS

This invention relates to projection screens for slides or other stills, and films.

One object of the invention is to provide a projection screen affording wide angle viewing.

Another object is to provide a projection screen giving a sharp and brilliant picture even without subduing the lighting of the space in which the screen is located, i.e., a daylight screen affording high illumination or brilliance and clear definition or resolution of the picture.

Yet another object is to provide a projection screen affording very wide angle viewing in subdued lighting or total darkness.

According to the present invention, a projection screen comprises a backing with a reflective hairline surface, to afford wide angle viewing, and a matt overlay of transparent material, into which the picture is reflected and retained.

For a daylight screen the matt overlay comprises a pigmented solution of a modified vinyl acetate/vinyl alcohol copolymer in a mixture of ketones and hydrocarbons of the type disclosed for example in U.S. Pat. No. 2,934,997. The reflective hairline surface affords wide angle viewing in a direction perpendicular to the lines (which, therefore, are usually employed in a vertical direction) of a sharp and brilliant picture resulting from the thinness of the coat of pigmented polymer into which the picture is reflected. The pigmented copolymer may be applied by spraying, roller coating, curtain coating, reverse roll coating, or gravure printing, but whatever the manner of application the coat will be appreciably thinner than plastics films hitherto laminated to or on reflective surfaces for this purpose and, therefore, the pigmented copolymer coat will absorb less light than plastics films, with consequent improvement in the definition of the picture. One pigment, which affords the desired picture retention, is preferably finely divided silica, or finely divided silica coated with stearate.

For a screen for use in subdued lighting or total darkness, the matt overlay comprises a transparent plastics film having a brushed finish on the surface remote from the backing with the reflective hairline surface, with the lines of both materials extending in the same direction. The combination of the reflective hairline surface and the brushed-silk finish aligned in the same direction affords a brilliant picture with wide angle viewing (i.e., anything up to 45°) either way perpendicular to the lines (which, therefore, are usually employed in a vertical direction), and the brushed surface creates warm tones without detracting from the definition.

In either screen, the backing may be sheet metal, e.g., aluminium, one surface of which is scratched in parallel lines to provide the reflective hairline surface; or it may be a rigid sheet one surface of which is scratched in parallel lines to provide a hairline surface which is vacuum coated with a reflective metal, e.g., aluminium; or it may be a rigid sheet one surface of which is vacuum coated with a reflective metal, e.g., aluminium, and the coated surface scratched in parallel lines to provide a hairline surface. Preferably, however, the backing comprises plastics film, e.g., polyester film, one surface of which is mechanically brushed to provide a hairline surface which is vacuum coated with a reflective metal, e.g., aluminium, the backing being suitable for attachment to a supporting frame, by heat tensioning or stretching while heated to tension by contraction on cooling, laminating to a rigid sheet, or laminating to a sheet of flexible plastics, e.g., polyvinylchloride, or canvas, or other fabric which can be rolled.

EXAMPLES

The invention will now be described further by reference to examples and to the accompanying drawings, in which:

FIG. 1 is a general view of a portion of a daylight screen according to the invention, greatly exaggerated as to thickness;

FIG. 2 corresponds to FIG. 1 but shows a portion of a screen according to the invention for use in subdued lighting or total darkness;

FIG. 3 is a section through a rigid screen utilising the material of FIG. 1, or the material of FIG. 2;

FIG. 4 corresponds to FIG. 1 but shows the daylight screen adhesively secured to a rigid support;

FIG. 5 is a similar illustration to FIG. 4 but shows a portion of a roll screen; and FIG. 6 is a diagram showing the test layout for comparison of the illumination or brilliance of a daylight screen according to the invention with that of a standard matt surface screen.

In FIG. 1 a portion 1 of a daylight screen comprises a backing 2 consisting of "Melinex" polyester film, 0.001 inch thick mechanically brushed on one side 3 to provide a hairline surface, which is vacuum coated with aluminium, at 1.5 to 2.0 ohms, and then gravure printed with a pigmented solution of a modified vinyl acetate/vinyl alcohol copolymer in a mixture of ketones and hydrocarbons, the pigment being finely divided silica coated with stearate, the quantity of dried pigmented coat being 7 to 10 grams per square metre.

The reflective hairline surface 3 affords wide angle viewing in a direction perpendicular to the lines (which, therefore, are usually employed in a vertical direction) of a sharp and brilliant picture resulting from the thinness of the coat 4 of pigmented polymer into which the picture is reflected.

In FIG. 2 a portion 5 of a projection screen for use in subdued lighting or total darkness comprises a backing 2 consisting of "Melinex" polyester film, 0.001 inch thick mechanically brushed on one side 3 to provide a hairline surface, which is vacuum coated with aluminium, at 1.5 to 2.0 ohms, and then overlaid with a transparent plastics film 6, 0.004 inch thick, having a brushed-silk surface 7 remote from the backing 2, with the lines on both materials 2, 6 extending in the same direction.

The combination of the reflective hairline surface 3 and the brushed finish 7 affords a brilliant picture with wide angle viewing (i.e., anything up to 45°) either way perpendicular to the lines (which, therefore, are usually employed in a vertical direction), and the brushed surface 7 creates warm tones without detracting from the definition.

In FIG. 3, a rigid frame 8 is formed of aluminium channel 9 with a slight flange 10 over which the material 1 of FIG. 1 or the material 5 of FIG. 2 is stretched and secured by its margins 11 at the back of the frame, the channel 9 of the latter conveniently being utilised for the location of foamed plastics 12 affording stiffness without adding any appreciable weight. The Melinex 2 is preferably heat shrunk, as described in British Patent Specification No. 841,875, after stretching over the frame 8 and securing at the back by the margins 11; in the case of a daylight screen the material 1 as a whole may be affixed in this way, while in the case of a screen for use in subdued lighting or total darkness the Melinex only is affixed in this way and the transparent film 6 is heated and stretched over the covered frame and then allowed to cool to tension the transparent film over the already tensioned Melinex.

In FIG. 4 the material 1 for a daylight screen is shown secured to a rigid support 13 of plastics material by adhesive applied marginally or all over, while in FIG. 5 the same material 1 is shown secured by pressure adhesive to a polyvinylchloride support material 14, 0.008 inch to 0.020 inch thick. Heat is not required for making the roll screen of FIG. 5 and should be avoided. A roll screen may be converted to a fixed screen by securing the roll screen to a rigid support or frame.

TEST RESULTS

Comparative tests have been carried out to establish and quantity the difference in performance between a standard matt surface screen and a daylight screen as described above. The test layout was as shown in FIG. 6, the lines of the hairline surface 3 being disposed vertical.

A. ILLUMINATION OR BRILLIANCE TEST

For each screen the distance P of the projector from the centre of the screen was 7 feet-6 inches and the distance M of the light meter from the centre of the screen was 12 feet-0 inch from all readings

| Position of Light Meter | 0° | 15° | 30° | 45° | 60° |
|---|---|---|---|---|---|
| Readings of (Standard Screen | 53 | 55 | 55 | 55 | 55 |
| Light Meter (Daylight Screen | 110 | 100 | 90 | 70 | 60 |
| % increase in illumination | | | 105 82 | 64 27 | 10 |

B. DEFINITION OR RESOLUTION TEST

Readings were taken with a U.S.A.F. resolving power target at 12 feet-0 inch from the centre and the four corners of each screen and averaged, and the Daylight Screen of the invention showed an improvement of 25 percent over the Standard Matt Screen.

British Standards Institution Test No. T1715 has been carried out with the screen for use in subdued lighting or total darkness, and the luminance factors for a range of angles of viewing are compared below with those obtained with a ribbed silver fabric screen.

| Angle of Viewing | Luminance Factor | |
|---|---|---|
| | Ribbed Silver Fabric Screen | Screen for subdued lighting or total darkness |
| 0 | 2.07 | 3.41 |
| 5 | 2.03 | 2.89 |
| 10 | 1.78 | 2.67 |
| 15 | 1.54 | 2.48 |
| 20 | 1.34 | 1.97 |
| 25 | 1.21 | 1.69 |
| 30 | 1.13 | 1.55 |
| 35 | 1.12 | 1.32 |
| 40 | 1.15 | 1.20 |
| 45 | 1.25 | 1.12 |

What I claim is:

1. A projection screen comprising a backing having opposite surfaces, one of said surfaces being reflective, said reflective surface also being provided with parallel lines to provide a hairline surface thereon, and a matt overlay of transparent material over the hairline surface.

2. A projection screen according to claim 1 wherein the backing is a rigid material scratched in parallel lines to provide the hairline surface and having aluminum as the reflective surface deposited thereon.

3. A projection screen according to claim 1 wherein the backing is sheet metal material, one surface of which is reflective, and the reflective surface being scratched in parallel lines to provide the hairline surface.

4. The projection screen of claim 1 wherein the backing is a rigid sheet coated on one surface with a reflective metal coating, and the metal coating is scratched in parallel lines to provide the hairline surface.

5. The projection screen of claim 1 wherein the matt overlay of transparent material is a plastic film.

6. The projection screen of claim 5 wherein the matt overlay of transparent material is a pigmented solution of vinyl acetate/vinyl alcohol copolymer in a mixture of ketones and hydrocarbons.

7. The projection screen of claim 1 wherein the surface of said backing opposite to the reflective surface is secured to a support.

8. The projection screen of claim 1 wherein the surface of said backing opposite the reflective surface is secured to a rigid frame.

9. The projection screen according to claim 1 wherein the matt overlay of transparent material comprises a transparent plastic film having a brushed exterior surface to provide lines thereon, with the lines thereof being aligned in the same direction as the lines in the hairline surface on the backing.

10. A projection screen according to claim 9 wherein the backing is a rigid material scratched in parallel lines to provide the hairline surface and having aluminum as the reflective surface deposited thereon.

11. A projection screen according to claim 9 wherein the backing is sheet metal material, one surface of which is reflective, the reflective surface being scratched in parallel lines to provide the hairline surface.

12. The projection screen of claim 9 wherein the backing is a rigid sheet coated on one surface with a reflective metal coating, and the metal coating is scratched in parallel lines to provide the hairline surface.

13. The projection screen of claim 9 wherein the matt overlay is a plastic film.

14. The projection screen of claim 13 wherein the matt overlay of transparent material is a pigmented solution of vinyl acetate/vinyl alcohol copolymer in a mixture of ketones and hydrocarbons.

15. The projection screen of claim 9 wherein the surface of said backing opposite to the reflective surface is secured to a support.

16. The projection screen of claim 9 wherein the surface of said backing opposite the reflective surface is secured to a rigid frame.

* * * * *